No. 755,977. PATENTED MAR. 29, 1904.
J. H. WHITE.
DETACHABLE SHOULDER REST FOR VIOLINS OR OTHER INSTRUMENTS.
APPLICATION FILED JULY 23, 1903.
NO MODEL. 2 SHEETS—SHEET 1.

WITNESSES: INVENTOR=

No. 755,977. PATENTED MAR. 29, 1904.
J. H. WHITE.
DETACHABLE SHOULDER REST FOR VIOLINS OR OTHER INSTRUMENTS.
APPLICATION FILED JULY 23, 1903.
NO MODEL. 2 SHEETS—SHEET 2.

WITNESSES:
J. M. Dolan.
J. E. R. Hayes

INVENTOR:
James H. White
by his atty

No. 755,977. Patented March 29, 1904.

UNITED STATES PATENT OFFICE.

JAMES H. WHITE, OF BOSTON, MASSACHUSETTS, ASSIGNOR TO ADOLPH J. OETTINGER, OF BOSTON, MASSACHUSETTS.

DETACHABLE SHOULDER-REST FOR VIOLINS OR OTHER INSTRUMENTS.

SPECIFICATION forming part of Letters Patent No. 755,977, dated March 29, 1904.

Application filed July 23, 1903. Serial No. 166,712. (No model.)

*To all whom it may concern:*

Be it known that I, JAMES H. WHITE, a citizen of the United States, and a resident of Boston, in the county of Suffolk and State of Massachusetts, have invented a new and useful Improvement in Detachable Shoulder-Rests for Violins or other Instruments, of which the following is a full, clear, and exact description, reference being had to the accompanying drawings, forming a part of this specification, in explaining its nature.

My invention relates to an improvement in detachable shoulder-rests for violins or other instruments having a chin-rest. Chin and shoulder rests are oftentimes both attached to a violin for the reason that some, and especially inexperienced players, can better hold the instrument lodged between the chin and shoulder when the shoulder-rest acts as an interposed backing therefor. By reason of the fact that the respective rests act as correlating members, one acting to offset the other, they are therefore conveniently combined in their attachment to the instrument. By reason of the fact also that at times the use of the shoulder-rest is undesirable it is accordingly detachably combined with the chin-rest, or so as to be separately disconnected from the violin. It is from this necessary detachability of the shoulder-rest that my invention is the outcome; and it comprises such a detachable shoulder-rest as may be combined with any kind or make of chin-rest. There are various kinds and makes of chin-rests in the market, and it is the especial object of my invention to have such a detachable shoulder-rest as may be combined with any one of them.

It is also within the purpose of my invention that the detachable shoulder-rest shall be such that the violin will be left with no projecting edge or other protuberance when the shoulder-rest is disconnected therefrom, for if such a projection be left it will not only be unsightly and a source of inconvenience, but it will also make the violin rest unevenly in its case, causing it to rattle, which is not only a disagreeable factor, but also one injurious to the violin.

Figure 1:
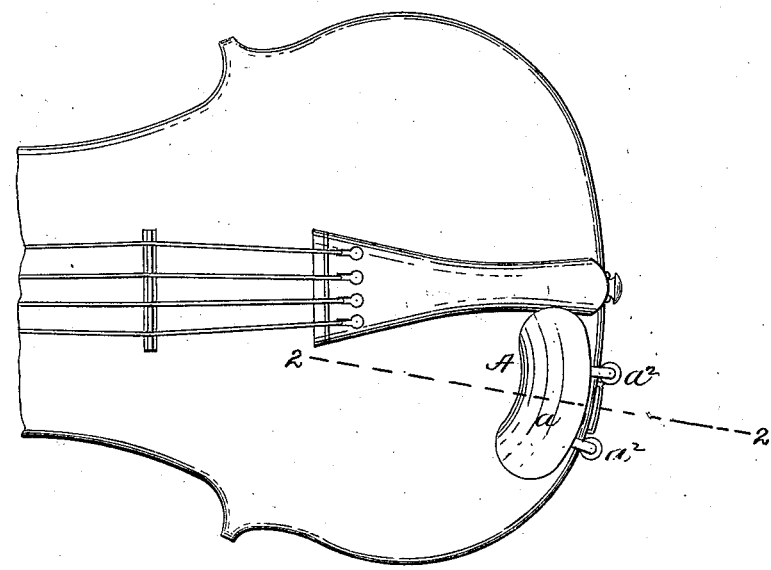
Figure 4:
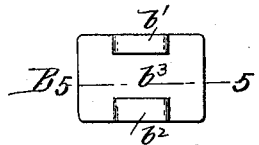
Figure 5:
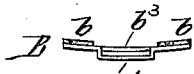
Figure 2:
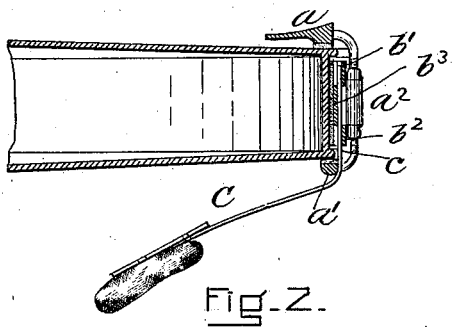
Figure 3:
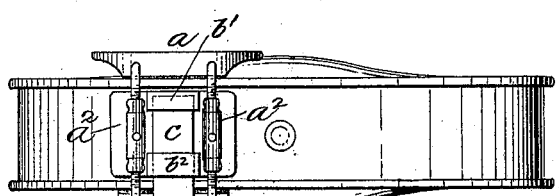
Figure 6:
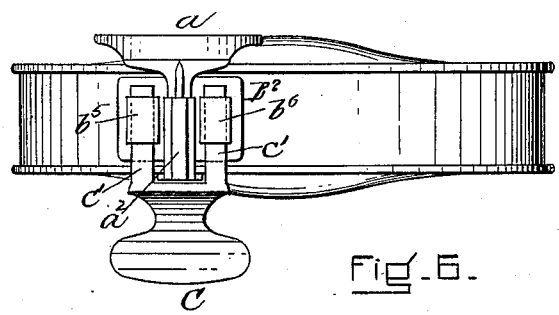
Figure 7:
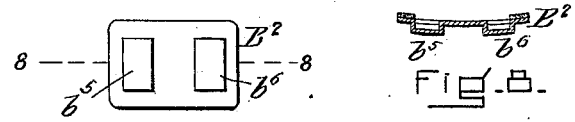
Figure 8:
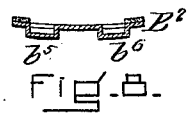
Figure 9:
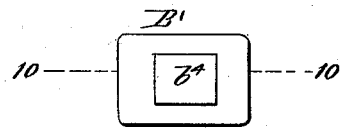
Figure 10:
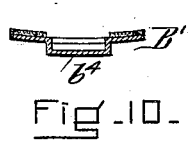
Figure 11:
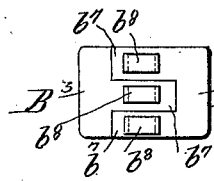
Figure 12:
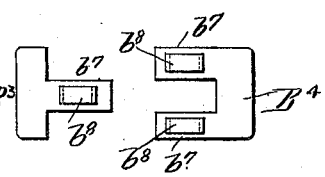

Referring to the drawings forming a part of this specification, and by reference to which the various details of construction comprising my invention can best be seen and understood, Figure 1 is a plan of a portion of a violin having a combined chin and shoulder rest attachment and being shown especially in connection with Fig. 2, showing a cross-section on the line 2 2 of Fig. 1, the relative disposition of the chin and shoulder rest being shown, and especially the improved means by which their combined attachment to the violin is obtained. Fig. 3 shows the violin and combined attachment in end elevation. Fig. 4 shows in elevation a socket-bearing plate, which comprises an essential element of the improved means of attachment. Fig. 5 shows a cross-section of said plate on the line 5 5 of Fig. 4. Fig. 6 represents the violin and combined attachments in end elevation, showing especially the violin fitted with a form of chin-rest having but one clamping-rod and the shoulder-rest combined therewith by a slightly-modified form of attachment, to which reference will hereinafter be made. Fig. 7 shows in elevation a modified form of socket-bearing plate which comprises an essential element of the modified form of attachment just referred to in Fig. 6. Fig. 8 shows a cross-section of said plate on the line 8 8 of Fig. 7. Fig. 9 shows in elevation a modified form of socket-bearing plate especially adapted to be combined with a form of chin-rest having two clamping-rods. Fig. 10 shows a cross-section of the same on the line 10 10 of Fig. 9. Fig. 11 shows in elevation the socket-bearing plate made in two sections with the sections shown combined. Fig. 12 shows the same in elevation, but with the two sections of the socket-bearing plate disconnected from one another.

In the drawings, A represents the chin-rest fixed to a violin, a portion of which only is shown. The formation of the chin-rest is but arbitrary, it being chosen as a kind of chin-rest in common use, and in so far as is necessary to a proper understanding of my invention being characterized in construction by the rest proper, $a$, the lower flanged end $a'$, and the connecting or clamping rods $a^2$ by which the parts $a\ a'$ are attached to the violin.

It is to be noted that when the chin-rest is in proper attachment with the violin there is left some little space forming a natural socket between its clamping-rods and the edge of the violin, which space, apart from any relative disposition of the clamping-rods, is obtained by reason of the fact that the rim of the violin is made beaded, with the effect that the clamping-rods of the chin-rest are removed or set out some little distance from the edge of the instrument. Moreover, in this connection while I have referred to the chin-rest as having clamping-rods by which its attachment to the violin is secured, yet the chin-rest may be held to the violin by other means and this space just referred to still obtain; but, as said before, the form of chin-rest shown is but arbitrary and it is referred to as having clamping-rods merely for the sake of expediency, such rods being merely representative of any clamping means by which the chin-rest may be secured to the edge of the violin. Within this space, however obtained, is a plate B, fixed between the edge of the violin, against which it bears, on the inside and the clamping-rods of the chin-rest on the outside. The plate B is preferably rectangular in shape, made somewhat rounding to conform to the edge of the violin, and upon its inside, preferably, is some soft protective covering $b$, which prevents it from scratching the surface of the violin or in any way interfering with its proper sounding. This plate B forms the auxiliary means of attachment with which the shoulder-rest C is fitted and by which it may be detachably secured to the violin and, moreover, in position to properly combine with the chin-rest fastened thereto. Such detachable attachment may be obtained by forming in the plate a socket, preferably made rectangular and flattened in shape to receive the flattened bent end $c$ of the arm to the shoulder-rest C, which is making it in its simplest and best form, the bent end of the shoulder-rest being adapted to be simply thrust into the socket formed in the plate B, when the shoulder-rest will be joined thereto and so to the violin. A socket may be formed in the plate B by raising or striking up separate portions thereof, as portions $b' b^2$, between the clamping-rods $a^2$ of the chin-rest, leaving an intervening main portion $b^3$, when the shoulder-rest may be pinned to said plate B by its bent end being thrust into the flat socket so formed between its main and raised portions. (See Figs. 3, 4, and 5.)

In Figs. 9 and 10 a slightly-modified plate B' is shown, which instead of having its socket formed by two raised portions has it formed by but one, a central raised portion $b^4$, between which and the adjacent main portions of the plate the bent end of the shoulder-rest may be inserted, and so the shoulder-rest combined with said plate. By thus raising the plate in either of the ways just described a most efficient means of retention is obtained for holding the shoulder-rest, while the raised portion or portions of the plate coming as they do between the clamping-rods of the chin-rest tend to hold the plate against lateral play.

In Figs. 6, 7, and 8 a plate $B^2$ is shown, having a double instead of a single socket, as before referred to, and the bent end C' of the shoulder-rest is made forked to correspond with these sockets. This construction is by reason of the fact that the chin-rest has but a single instead of two clamping-rods, and the plate $B^2$ is formed with two sockets, and so the end of the shoulder-rest is made forked to fit therein on either side of said single clamping-rod. The double sockets may be formed by striking up separate portions of the plate, as portions $b^5 b^6$, to come on either side of the single clamping-rod of the chin-rest when the plate is in place. The forked end of the shoulder-rest may be then combined with said plate and avoid any interference with the clamping-rod of the chin-rest. By the use of this auxiliary plate disposed as it is the shoulder-rest is not only securely fixed to the violin to combine with the chin-rest, but it also is made an attachment independent of the chin-rest and which can be combined with any kind of chin-rest whatever the kind or make may be.

When the shoulder-rest is disconnected from the violin, no projecting edge or shoulder is left. The auxiliary plate may well be left permanently in the space within which it is contained between the rods of the chin-rest and the edge of the violin, although it may be taken out at will by removing the chin-rest when every element which has anything to do with the shoulder-rest is detached from the violin. In this connection there is shown in Figs. 11 and 12 a construction of plate which can be placed in the space left between the clamping-rods of the chin-rest and the edge of the violin or removed therefrom without interfering with the chin-rest in any way. This is by forming the plate in two sections $B^3 B^4$, which separately can be placed back of the respective clamping-rods of the chin-rest, when portions $b^7$ of said sections will lap by one another between said rods. These interlapping portions $b^7$ of the sections are each provided with a raised portion $b^8$, which raised portions are in line with one another when the two parts of the plate are properly combined, and they are formed to receive the bent end of the shoulder-rest, which when thrust into the socket thus formed between the raised and main portions of the plate not only has the effect of pinning the two sections of the plate together, but the shoulder-rest itself is also fastened thereto. A plate so formed can easily be slipped out from behind the clamping-rods of the chin-rest after the bent end of the shoulder-rest has been withdrawn.

While I have referred to my improved device as an improved means for detachably combining chin and shoulder rests in violins, I mean also to include in such reference any other instrument having the nature of a violin with which my improved means of attachment could be used.

Having thus fully described my invention, I claim and desire to secure by Letters Patent of the United States—

1. In an attachment for violins or similar instruments of the character specified, the combination with a chin-rest and means for clamping or otherwise attaching the same to an instrument, of a plate adapted to be interposed between said attaching means of the chin-rest and the adjacent side edge of the instrument to which it is attached, and a shoulder-rest the arm of which is secured to said plate.

2. In an attachment for violins or similar instruments of the character specified, the combination with a chin-rest and means for clamping or otherwise attaching the same to an instrument, of a plate adapted to have placement between said attaching means of the chin-rest and the adjacent side edge of the instrument to which it is attached, a shoulder-rest, and means whereby the same may be detachably secured to said plate.

3. An attachment for violins or similar instruments of the character specified having a chin-rest provided with a clamping rod or rods or other means of retention whereby said chin-rest may be secured to the instrument, said attachment comprising a plate adapted to be interposed between the attaching means of the chin-rest and the adjacent side edge of the instrument to which it is attached, and a shoulder-rest having a bent end making connection with said plate.

4. An attachment for violins or similar instruments of the character specified having a chin-rest provided with a clamping rod or rods or other means of retention to an instrument, said attachment comprising a socket-forming plate adapted to be interposed between the clamping rod or rods of the chin-rest and the adjacent side edge of the instrument to which it is attached, and a shoulder-rest having a bent end, which end is adapted to be detachably combined with said plate by entering the socket or sockets thereof.

5. An attachment for violins or similar instruments of the character specified having a chin-rest provided with a clamping rod or rods whereby said chin-rest may be attached to an instrument, said attachment comprising a plate adapted to be interposed between the clamping rod or rods of said chin-rest and the adjacent side edge of the instrument, said plate having a main and a struck-up portion or portions, and a shoulder-rest the bent end of which is adapted to combine with said plate by being thrust into the socket or sockets formed between its main and struck-up portion or portions, substantially as described.

6. In an attachment for violins or similar instruments of the character specified, the combination with a chin-rest, of means for clamping or otherwise attaching the same to an instrument, said means for attachment being so disposed as to leave a space or socket interposed between the same and the adjacent edge of the instrument to which said chin-rest is attached, a shoulder-rest having a bent end, and means for detachably holding said bent end of the shoulder-rest within said space or socket.

7. An attachment for violins or similar instruments of the character specified having a chin-rest provided with a clamping rod or rods or other means of retention to said instrument, said attachment comprising a plate adapted to be interposed between the attaching means of the chin-rest and the adjacent side edge of the instrument, said plate being made in two sections, and a shoulder-rest having a bent end, which end of the shoulder-rest combines with sections of the interposed plate substantially as described.

8. An attachment for violins or similar instruments of the character specified having a chin-rest provided with clamping-rods, or like means of retention to said instrument, said attachment comprising a plate adapted to be interposed between the clamping-rods of said chin-rest and the adjacent side edge of the instrument, said plate comprising two sections, which separately can be placed back of the respective clamping-rods of the chin-rest when portions of the said sections will lap by one another between said rods, and which interlapping portions of the sections are each provided with a raised portion coming in line with one another when the two parts of the plate are properly combined, and a shoulder-rest having a bent end, which bent end of the shoulder-rest is adapted to combine with said plate by being thrust between the raised portions of its interlapping parts and the main portions thereof.

JAMES H. WHITE.

Witnesses:
F. F. RAYMOND, 2d,
J. M. DOLAN.